(No Model.)

J. C. NEFF.
MOWER AND REAPER KNIFE GRINDER.

No. 342,125. Patented May 18, 1886.

Attest:
Court A. Cooper
H. H. Coles

Inventor:
Jacob C. Neff
by J. A. Wiedersheim & Co.

UNITED STATES PATENT OFFICE.

JACOB C. NEFF, OF PERRYSBURG, OHIO.

MOWER AND REAPER KNIFE GRINDER.

SPECIFICATION forming part of Letters Patent No. 342,125, dated May 18, 1886.

Application filed April 9, 1885. Serial No. 161,683. (No model.)

*To all whom it may concern:*

Be it known that I, JACOB C. NEFF, a citizen of the United States, residing at Perrysburg, county of Wood, State of Ohio, have invented a new and Improved Mower and Reaper Knife Grinder, which improvement is fully set forth in the following specification and accompanying drawings, in which—

Figure 1:
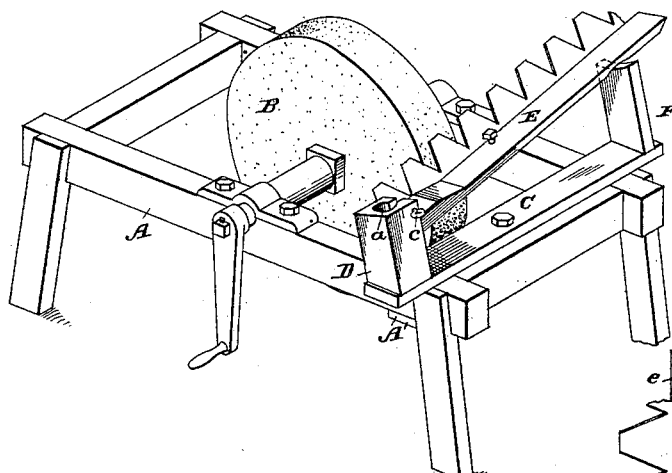
Figure 2:
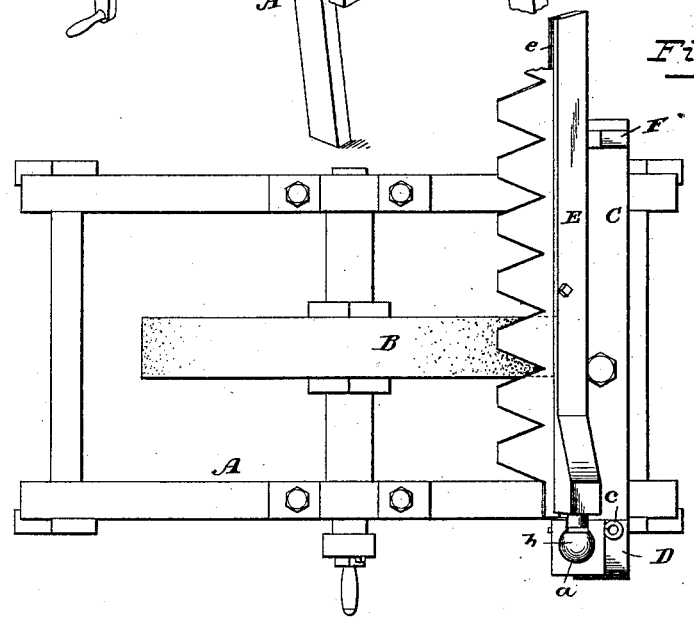
Figure 3:
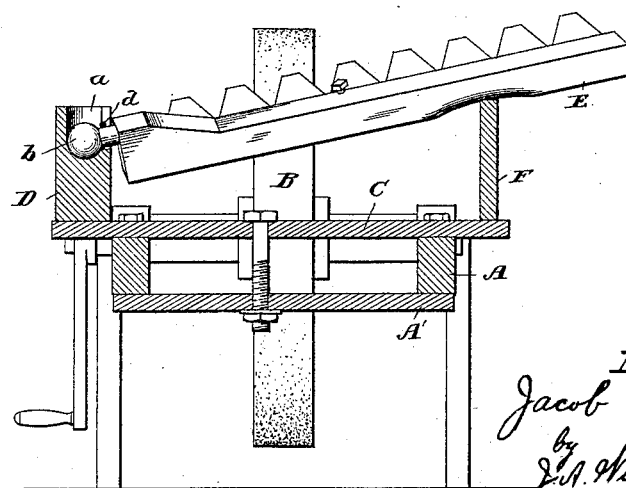

Figure 1 represents a perspective view of a knife-grinder embodying my invention in operative position. Fig. 2 is a top view of the knife-grinder shown in Fig. 1. Fig. 3 is a central section thereof.

Similar letters indicate corresponding parts in the several figures.

My invention consists of an improved mower and reaper knife grinder, formed of the parts and operating in the manner hereinafter fully set forth and claimed.

In the drawings, A represents the frame supporting a grindstone, and B a grindstone.

C represents the bed-plate of the knife-grinder, which bed-plate is pivotally secured near its center by a bolt or screw to a portion or cross-piece, A', of the frame A.

On one end of the bed-plate C is secured the post D, having a recess, a, the lower portion of which is spherical. The said recess is open both at the top and side, thus permitting the introduction or insertion of the rounded head b of the oscillating bar E. A pin, c, passing through the openings d, secures the end of the bar E in the recess a. By these means a ball-and-socket joint is formed and the bar E permitted to have an oscillating motion. On the other end of the bar C is the post F, the upper edge or face thereof being concave, so as to furnish a guide and support for the bar E in its movements during the operation of grinding. The oscillating bar E has in one of its sides a groove, e, extending lengthwise of the bar, and serving to hold the cutter-bar while the knives are being ground, a screw or other suitable device clamping the same therein.

Any suitable clamping device for securing the bed-plate C in the position or at the angle desired may be used.

The operation of the device is simple and readily understood.

The cutter-bar may, by this device, be ground with a uniform bevel and a perfect edge by turning the grindstone in either direction.

Having thus described my invention, I claim as new and desire to secure by Letters Patent—

1. A mower and reaper knife grinder composed of a bed-plate, an end post having a recess, an oscillating bar provided with a spherical head and having a groove, and a post having a concave top, substantially as described.

2. In a mower and reaper knife grinder, the pivotally-secured bed-plate C, having a recessed end post, D, and a post, F, having a concave top, in combination with an oscillating grooved bar, E, having a spherical head, b, whereby a ball-and-socket joint is formed with the recessed post D, substantially as and for the purpose set forth.

3. A mower and reaper knife grinder consisting of a bed-plate, provided with means, substantially as described, whereby it may be pivotally secured to the frame of a grindstone, a post having a recessed portion, the said recessed portion having a spherical lower part and a top and side opening, an oscillating bar having a spherical head and a longitudinal groove, and a post having a concave top, all of said parts being arranged and combined substantially as described.

JACOB C. NEFF.

Witnesses:
JAMES HAYES,
C. FINKBEINER.